Nov. 19, 1935.　　　　P. B. REEVES　　　2,021,136
SPEED VARYING TRANSMISSION UNIT

Filed Feb. 7, 1933

INVENTOR.
Paul B. Reeves,
BY
Hood + Hahn,
ATTORNEYS

Patented Nov. 19, 1935

2,021,136

UNITED STATES PATENT OFFICE 2,021,136

SPEED VARYING TRANSMISSION UNIT

Paul B. Reeves, Columbus, Ind., assignor to Reeves Pulley Company, Columbus, Ind., a corporation of Indiana Application February 7, 1933, Serial No. 655,649

4 Claims. (Cl. 74—230.17)

The object of my invention is to produce a compact and efficient speed varying motor unit of the edge-active belt type which may be produced at low cost.

The accompanying drawing illustrates my invention.

Figure 1:
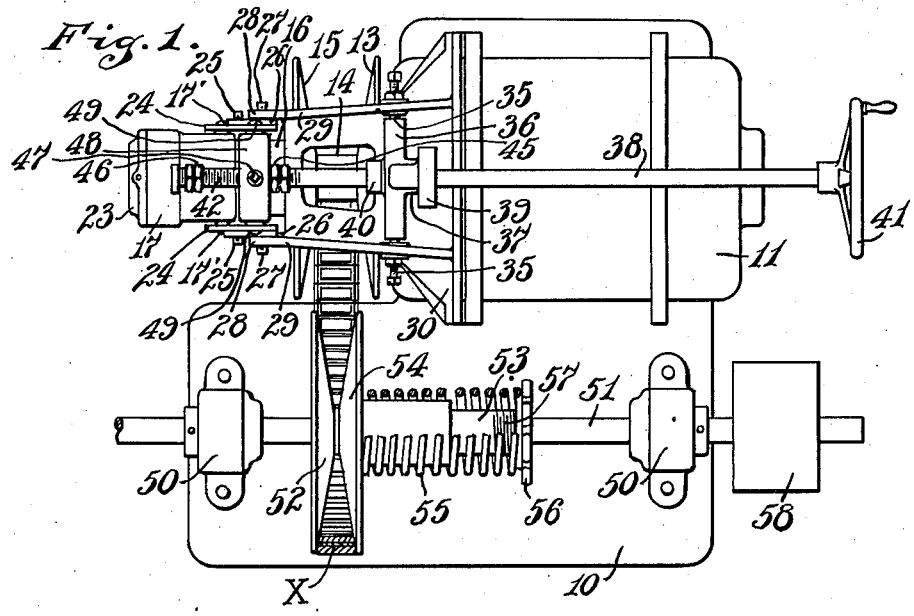
Figure 2:
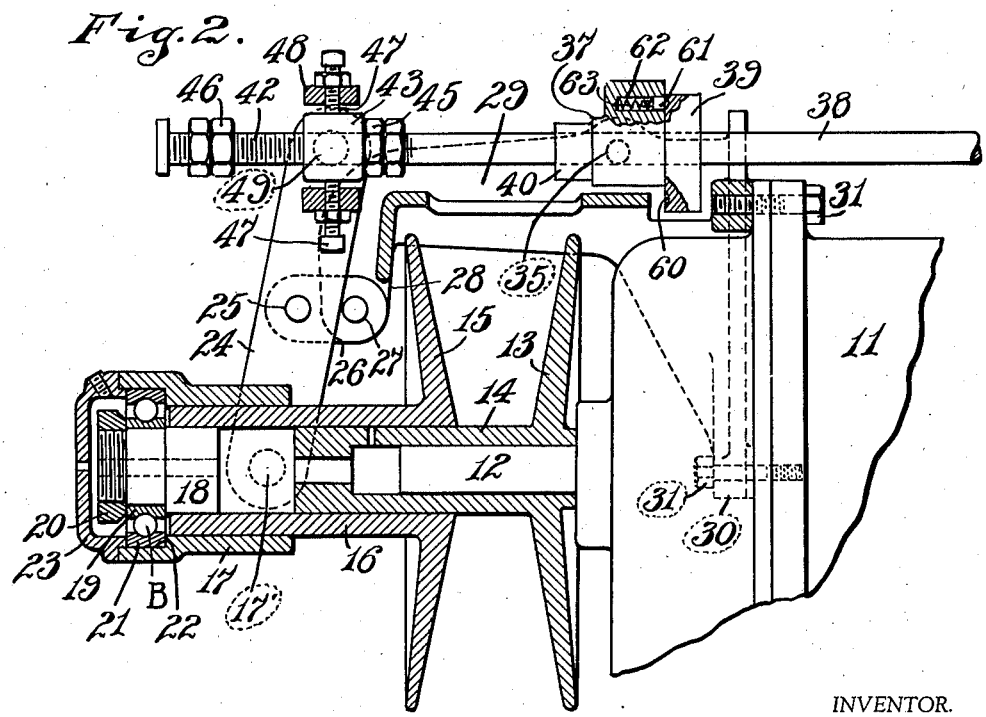

Fig. 1 is a plan of an embodiment of my invention, in partial horizontal section; and Fig. 2 is a vertical section, on a larger scale, axially through the driving pair of cones.

In the drawing 10 indicates a base plate to which is secured an electric motor 11 having a shaft 12. Keyed to shaft 12 is a friction cone 13 having an elongated hub 14 upon which is splined a friction cone 15, the two cones 13 and 15 forming a cone pair adapted to receive and cooperate with an edge-active belt X of any well known form.

Cone 15 is axially movable toward and from its fellow cone 13 so that, with an edge-active belt of definite width, adjustment of cone 15 relative to its fellow 13 will determine the radius of belt contact with the cone pair. Cone 15 is provided with an elongated hub 16 upon the outer end of which is journaled a sleeve 17. Secured in the outer end of the bore of hub 16 is a plug 18 upon which is secured the inner race 19 of an antifriction bearing B by means of nut 20. The outer race 21 of bearing B is seated in a pocket 22 formed at the outer end of sleeve 17 and is held axially therein by cup 23. Sleeve 17 is provided at each side with laterally-projecting pins 17', 17' upon which are respectively pivoted the lower ends of levers 24, 24, each of which is respectively fulcrumed at 25 upon the outer ends of links 26, 26 which are pivotally anchored at 27, 27 upon the depending portions 28, 28 of an arm 29 carried by a base plate 30 attached by bolts 31 to one end of the casing of motor 11.

Pivotally supported between the horizontal pivot pins 35, 35 on arm 29 is a rocker head 36 provided with a journal bearing 37 in which is journaled a shaft 38 held against axial movement relative to rocker head 36 by collars 39 and 40. Shaft 38 is provided with a hand wheel 41 by means of which it may be readily rotated and, adjacent the upper ends of levers 24 is provided with threads 42 upon which is mounted a nut 43 adapted to traverse the threads 42 and limited in its possible movements lengthwise of shaft 38 by adjustable abutment nuts 45 and 46. Pivotally connected to nut 43 on an axis transverse to the axis of shaft 38 by means of the pivot screws 47, 47 is a yoke 48 provided with laterally-extending pivot pins 49, 49, the aligned axes of which are at right angles to pivot pins 47 and shaft 38 and said pivot pins project through the upper ends of the adjacent levers 24.

Journaled in suitable bearings 50, 50, carried by base 10 is the driven shaft 51 which is supported parallel with shaft 12 and secured to this shaft is a friction cone 52 having an elongated hub 53 upon which is splined a companion friction cone 54 which is yieldably urged towards its fellow cone 52 by means of a spring 55 which, at its outer end abuts against a nut 56 axially adjustable upon hub 53 by means of threads 57.

Shaft 51 carries one or more pulleys 58 by means of which power may be delivered to one or more machines to be driven at variable speeds, dependent upon the relative adjustments of the cone pairs.

The axially fixed cones 13 and 52 are so positioned, relative to each other, that they rotate in spaced parallel planes such that when the edge-active belt is in engagement with the middle radius of cone 13 it will also be in engagement with the middle radius of cone 52 and consequently when cone 15 has been moved to its middle position relative to cone 13, the belt will be in engagement with the middle radii of cones 13 and 15 and in contact with the middle radii of cones 52 and 54, at which time the median planes between the cone pair 52 and 54 and the cone pair 13 and 15 will be coincident.

When cones 52 and 13 are thus definitely axially fixed and cone 15 is then moved to its outermost position away from its fellow 13, so that the belt may contact the smallest radii of the cone pair 13 and 15, the cone pair 52 and 54 will be symmetrical with the median transverse plane of the cone pair 13—15.

In operation, with the parts in the position shown in Fig. 1, the belt will contact the smallest radii of the cone pair 13 and 15 and with the largest radii of the cone pair 52 and 54 and at this time spring 55 will be in its most expanded, or weakest, effective condition.

As cone 15 is moved axially toward cone 13, by the action of shaft 38, cone 15 will be crowded into the adjacent bight of the belt, thus drawing the belt as a whole transversely of the shafts 12 and 51, thereby forcing cone 54 to the right, (Fig. 1), and when cone 15 reaches its nearest position to its fellow 13 and the belt will be contacting the largest radii of the cone pair 13—15 and the smallest radii of the cone pair 52—54, at which time spring 55, having been compressed, will be exerting a somewhat greater force upon the edges of the belt. It will be noted that, because spring 55 is associated with the driven cone pair, rather than the driving cone pair, the maximum strength of the spring 55 is exerted upon the belt at a time when the greatest resistance offered by shaft 51 is to be overcome, whereas, if the spring 55 were arranged to act upon the driving cone 15 and the positive adjusting means arranged to act upon the driven cones 52—54, the spring would be exerting its maximum effect upon the belt at a time when the driven shaft is offering its minimum resistance, and its minimum effect at a time when the driven shaft is offering its maximum resistance.

In practice it is highly desirable that the compressive effect upon the edge of the belt be no greater than what is required to transmit the necessary power from the driving shaft to the driven shaft and by providing means for positively adjusting the driving cone 15 in either direction a definite positioning of this cone may be at all times easily and accurately attainable and the spring-pressed cone will automatically adjust itself to a comparable position and will maintain at all times a proper tension in the belt appropriate to the resistance offered by the driven shaft and this result may be attained with a spring of minimum strength.

I am aware that it has been heretofore proposed to provide a transmission unit comprising two cone pairs somewhat similar to those of my device, one cone of each pair being axially fixed and the other cone of each pair being axially shiftable, with the shiftable cone of one pair spring-urged towards its fellow and with a one-way acting mechanism for positively urging the other cone toward its fellow. Movement of the last-mentioned cone away from its fellow is dependent solely upon force exerted upon it by the belt due to the crowding action upon the belt by the spring which acts upon the movable cone of the first-mentioned pair, and as a consequence the spring must be much heavier than is required to hold its movable cone with sufficient force to transmit the power delivered by the motor element, and as a consequence of this heavy spring a very considerable force must be exerted manually upon the manually-shiftable cone because the strength of this extra heavy spring must be overcome when the manually shiftable cone is to be moved toward its fellow.

As already pointed out, the arrangement which I have disclosed permits a reduction of the strength of spring 55 without the sacrifice of power delivery capacity of the unit as a whole, thereby materially decreasing the wear upon the edges of the belt and materially lengthening the effective life of the apparatus.

I am aware that it has heretofore been proposed to provide a transmission unit comprising two cone pairs somewhat similar to those of my device, one cone of each pair being axially fixed and the other cone of each pair being positively axially shiftable toward or from its fellow, but in such an arrangement, unless there be provided an elaborate compensating mechanism which will simultaneously move the two shiftable cones in opposite directions at different rates, an operating mechanism cannot be provided because a longer belt is required when the cone pairs are at their opposite extremes than is required when the cone pairs are in their medial positions.

In order to provide against the possibility of accidental shifting of the cone 15, I prefer to form the collar 39 with a series of flutes or pockets 60 on its face adjacent the rocker head 36; and to mount a spring plunger 61 in a suitable socket 62 formed in said rocker head 36 for cooperation with said pockets 60. The plunger 61 is urged into engagement in the pockets 60 by a spring 63.

This application is a continuation in part and substitute for my co-pending application Serial No. 506,192 filed January 2, 1931.

I claim as my invention:

1. A speed-varying transmission unit comprising a power receiving shaft, a pair of friction cones mounted thereon to rotate therewith, one axially fixed on the shaft and the other splined thereon, a lever, a swinging fulcrum for said lever, a connection between one end of said lever and said splined cone whereby the splined cone may be axially shifted positively in either direction, a threaded shaft arranged substantially at right angles to the lever fulcrum, a journal bearing for said threaded shaft supported to swing on an axis parallel with said fulcrum, a nut on the threads of said threaded shaft and pivotally associated with said lever, a power-delivery shaft arranged parallel with the power-receiving shaft, a pair of friction cones mounted on said power-delivery shaft, one axially fixed thereon and one splined thereon, the two axially fixed cones being offset relative to each other in such position that the medial planes of the cone pairs when said cone pairs are in their medial positions, will be coincident, and the axially fixed cones are oppositely faced, a spring normally urging the splined cone on the power-delivery shaft toward its fellow, and an edge-active belt connecting the two cone pairs.

2. A speed varying transmission unit comprising two substantially parallel shafts, a pair of cone discs mounted on each shaft, one disc of each pair being axially fixed on its shaft and the other disc of each pair being axially shiftable toward and from its fellow, spring means urging one of said shiftable discs toward its fellow, a V-belt providing a driving connection between said pairs of discs, and means for positively shifting the other of said shiftable discs in opposite directions, comprising an elongated hub on said last-named disc, a thrust bearing mounted for rotation on said hub, a lever pivoted at one end on said bearing, a link pivotally anchored at its one end and providing a pivotal mounting at its other end for an intermediate point in the length of said lever, and means for shifting the opposite end of said lever positively in opposite directions.

3. A speed varying transmission unit comprising two substantially parallel shafts, a pair of cone discs mounted on each shaft, one disc of each pair being axially fixed on its shaft and the other disc of each pair being axially shiftable toward and from its fellow, spring means urging one of said shiftable discs toward its fellow, a V-belt providing a driving connection between said pairs of discs, and means for positively shifting the other of said shiftable discs in opposite directions, comprising an elongated hub on said last-named disc, a thrust bearing mounted for rotation on said hub, a lever pivoted at one end on said bearing, a link pivotally anchored at its one end and providing a pivotal mounting at its other end for an intermediate point in the length of said lever, a nut swivelled on the opposite end of said lever, and a screw shaft pivotally mounted, intermediate its ends, to swing on an axis substantially parallel with the axis of the pivotal connection between said lever and said bearing, said nut being threaded on said screw shaft.

4. A speed varying transmission unit comprising two substantially parallel shafts, a pair of cone discs mounted on each shaft, one disc of each pair being axially fixed on its shaft and the other disc of each pair being axially shiftable toward and from its fellow, spring means urging one of said shiftable discs toward its fellow, a V-belt providing a driving connection between said pairs of discs, and means for positively shifting the other of said shiftable discs in opposite directions, comprising an elongated hub on said last-named disc, a thrust bearing mounted for rotation on said hub, a lever pivoted at one end on said bearing, a link pivotally anchored at its one end and providing a pivotal mounting at its other end for an intermediate point in the length of said lever, a nut swivelled on the opposite end of said lever, a screw shaft pivotally mounted, intermediate its ends, to swing on an axis substantially parallel with the axis of the pivotal connection between said lever and said bearing, said nut being threaded on said screw shaft, and means for holding said screw shaft in any position of rotational adjustment.

PAUL B. REEVES.